United States Patent
An

(10) Patent No.: US 10,965,642 B2
(45) Date of Patent: Mar. 30, 2021

(54) NETWORK ADDRESS TRANSLATION

(71) Applicant: New H3C Technologies Co., Ltd., Zhejiang (CN)

(72) Inventor: Shaoliang An, Beijing (CN)

(73) Assignee: NEW H3C TECHNOLOGIES CO., LTD., Zhejiang (CN)

( * ) Notice: Subject to any disclaimer, the term of this patent is extended or adjusted under 35 U.S.C. 154(b) by 0 days.

(21) Appl. No.: 17/041,217

(22) PCT Filed: Mar. 22, 2019

(86) PCT No.: PCT/CN2019/079157
§ 371 (c)(1),
(2) Date: Sep. 24, 2020

(87) PCT Pub. No.: WO2019/184803
PCT Pub. Date: Oct. 3, 2019

(65) Prior Publication Data
US 2021/0014194 A1 Jan. 14, 2021

(30) Foreign Application Priority Data
Mar. 26, 2018 (CN) .................. 201810253605.X

(51) Int. Cl.
G06F 15/16 (2006.01)
G06F 9/54 (2006.01)
(Continued)

(52) U.S. Cl.
CPC ...... H04L 61/2521 (2013.01); H04L 45/7453 (2013.01); H04L 61/255 (2013.01); H04L 61/2517 (2013.01); H04L 61/2557 (2013.01)

(58) Field of Classification Search
CPC ................................. H04L 61/2514
(Continued)

(56) References Cited

U.S. PATENT DOCUMENTS 7,146,354 B1   12/2006 Tennican et al.
2008/0285562 A1* 11/2008 Scott .................. H04L 45/745
                                                              370/392

(Continued)

FOREIGN PATENT DOCUMENTS

CN        1777194 A    5/2006
CN      101132424 A    2/2008
(Continued)

OTHER PUBLICATIONS

State Intellectual Property Office of the People's Republic of China, Office Action and Search Report Issued in Application No. 201810253605X, dated Dec. 24, 2019, 9 pages, (Submitted with Machine Translation).

(Continued)

Primary Examiner — Hamza N Algibhah
(74) Attorney, Agent, or Firm — Greenblum & Bernstein, P.L.C.

(57) ABSTRACT

A Network Address Translation (NAT) method, apparatus and device are provided. Based on the method, a target IP address and its reference port are obtained from a NAT resource pool, wherein the reference port is a port in a consecutive port range of the target IP address; a first five-tuple corresponding to a packet is generated based on the target IP address, the reference port and an original five-tuple of the packet, and a second five-tuple is obtained by masking first-class bits of two classes of ports of the first five-tuple respectively; a target five-tuple is determined in a plurality of consecutive hash buckets of a hash table based on a hash result of the second five-tuple; and the target five-tuple and the original five-tuple are recorded in the hash table and a corresponding result table, and the packet is NAT-processed based on the target five-tuple.

10 Claims, 4 Drawing Sheets

(51) Int. Cl.
*H04L 29/06* (2006.01)
*H04L 29/12* (2006.01)
*H04L 12/743* (2013.01)

(58) Field of Classification Search
USPC .......................................................... 709/238
See application file for complete search history.

(56) References Cited

U.S. PATENT DOCUMENTS

| | | | |
|---|---|---|---|
| 2009/0138960 A1* | 5/2009 | Felty | G06N 5/025 |
| | | | 726/14 |
| 2013/0301522 A1* | 11/2013 | Krishna | H04L 61/2517 |
| | | | 370/328 |
| 2013/0301650 A1* | 11/2013 | Zou | H04L 61/2557 |
| | | | 370/467 |
| 2015/0131666 A1* | 5/2015 | Kang | H04L 45/745 |
| | | | 370/392 |
| 2016/0234112 A1* | 8/2016 | Anand | H04L 45/64 |
| 2017/0078245 A1 | 3/2017 | Wan et al. | |
| 2017/0346707 A1* | 11/2017 | Menon | H04L 61/256 |
| 2018/0054385 A1* | 2/2018 | Dharmapurikar | H04L 49/3063 |
| 2018/0302410 A1* | 10/2018 | Venkataraman | H04L 63/0263 |
| 2019/0166099 A1* | 5/2019 | Hicks | H04L 63/164 |
| 2020/0252315 A1* | 8/2020 | Cociglio | H04L 43/024 |

FOREIGN PATENT DOCUMENTS

| | | |
|---|---|---|
| CN | 101702657 A | 5/2010 |
| CN | 101800690 A | 8/2010 |
| CN | 104243631 A | 12/2014 |
| CN | 104468381 A | 3/2015 |
| EP | 2804440 A1 | 11/2014 |
| WO | 2010129682 A1 | 11/2010 |
| WO | 2017172183 A1 | 10/2017 |

OTHER PUBLICATIONS

ISA State Intellectual Property Office of the People's Republic of China, International Search Report Issued in Application No. PCT/CN2019/079157, dated Jun. 6, 2019, WIPO, 4 pages.

European Patent Office, Extended European Search Report Issued in Application No. 19775107.6, dated Jan. 27, 2021, Germany, 8 pages.

* cited by examiner

NETWORK ADDRESS TRANSLATION

CROSS-REFERENCE TO RELATED APPLICATION

The present application is a U.S. National Phase of International Patent Application Serial No. PCT/CN2019/079157 entitled "NETWORK ADDRESS TRANSLATION" filed on Mar. 22, 2019. International Patent Application Serial No. PCT/CN2019/079157 claims priority to Chinese Patent Application No. 201810253605.X entitled "A NAT TRANSLATION METHOD, APPARATUS AND NAT DEVICE" filed on Mar. 26, 2018. The entire contents of the above-referenced application are incorporated herein by reference for all purposes.

BACKGROUND

After a packet is received by a Network Address Translation (NAT) device, if the packet is to be NAT-processed and the packet satisfies a session information creation condition, the creation process is performed. The "session information" herein may include, for example, a five-tuple of a packet, that is, a source Internet Protocol (IP) address, a destination IP address, a source port, a destination port and a transport layer protocol.

NAT processing of a source IP address is taken as an example. An IP address and a port corresponding to the IP address are selected from a NAT resource pool, and a source IP address and a source port in an original five-tuple of the packet are replaced with the selected IP address and port to form a new five-tuple, and further, a hash table in a session table stored in a storage medium (such as a Double Data Rate (DDR) synchronous dynamic random access memory) is queried. When it is determined that the new five-tuple is a non-conflicting five-tuple, that is, a hash value calculated for the new five-tuple does not generate a hash conflict in the hash table, the new five-tuple and the original five-tuple are recorded in the hash table and a corresponding result table, and the NAT processing is performed for the packet based on the new five-tuple; otherwise, an IP address and a port corresponding to the IP address are re-selected from the NAT resource pool for analysis.

Although the NAT processing can be realized by the above creation process, the following problems still exist: only one new five-tuple can be detected in one conflict detection based on the existing manner of storing data of a hash table of a session table. When the new five-tuple generates a conflict, a plurality of detections is required. Since there is an interface delay every time the storage medium where the session table is located is read, the creation performance is undoubtedly terrible.

DETAILED DESCRIPTION OF THE EMBODIMENTS

Figure 1:
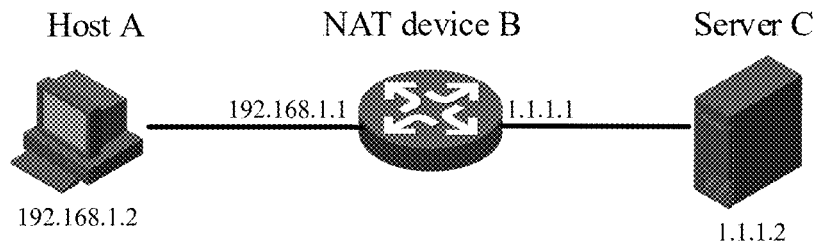
FIG. 1 is a schematic diagram illustrating a structure of a networking system according to an example of the present disclosure.

Examples will be described in detail herein with the examples thereof expressed in the drawings. When the following descriptions involve the drawings, like numerals in different drawings represent like or similar elements unless stated otherwise. The implementations described in the following examples do not represent all implementations consistent with the present disclosure. On the contrary, they are examples of an apparatus and a method consistent with some aspects of the present disclosure described in detail in the appended claims.

The terminology used in the present disclosure is for the purpose of describing a particular example only, and is not intended to be limiting of the present disclosure. The singular forms such as "a", 'said", and "the" used in the present disclosure and the appended claims are also intended to include multiple, unless the context clearly indicates otherwise. It is also to be understood that the term "and/or" as used herein refers to any or all possible combinations that include one or more associated listed items.

It is to be understood that although different information may be described using the terms such as first, second, third, etc. in the present disclosure, the information should not be limited to these terms. These terms are used only to distinguish the same type of information from each other. For example, the first information may also be referred to as the second information without departing from the scope of the present disclosure, and similarly, the second information may also be referred to as the first information. Depending on the context, the word "if" as used herein may be interpreted as "when" or "as" or "determining in response to".

Relevant contents of Network Address Translation (NAT) are described below to facilitate understanding the solutions of the present disclosure.

The NAT may be divided into Port Address Translation (PAT) and Not Port Address Translation (NO-PAT) based on a translation mode. In the NO-PAT mode, one extranet IP address (i.e., public network IP address) can be only assigned to one intranet IP address for NAT processing; in the PAT mode, one extranet IP address may be simultaneously assigned to a plurality of intranet IP addresses for sharing. The NAT mentioned in the present disclosure refers to the PAT mode.

In addition, the NAT may include an ingress interface translating a source IP address, an ingress interface translating a destination IP address, an egress interface translating a source IP address, and an egress interface translating a destination IP address according to different networking applications, and different address translation processes are similar.

The present disclosure provides a NAT method, a NAT apparatus and a NAT device to improve creation performance of a NAT process.

Firstly, the NAT method provided by the present disclosure will be described below. The NAT method provided by the present disclosure is applied to a NAT device. Specifically, the NAT method may be executed by a CPU in the NAT device. Certainly, the NAT method may also be executed jointly by the CPU and some hardware, where the some hardware may be an Application Specific Integrated Circuit (ASIC) or a Field-Programmable Gate Array (FPGA). The NAT device is an edge device of a network, and is configured to achieve purposes of allowing an internal network user to access an external public network and an external public network to access a part of internal resources (e.g., an internal server). For example, the NAT device may be a router, which is not limited herein.

In addition, the session table is divided into two levels of tables. Specifically, the first level of the session table is a hash table for storing signature information of a five-tuple obtained by hash calculation and a pointer pointing to a result table; the second level of the session table is a result table for storing a five-tuple and other forwarding-related information.

In a process of session information creation, after a non-conflicting target five-tuple is determined by querying a hash table, the target five-tuple and the corresponding original five-tuple may be recorded in the hash table, specifically including: (1) storing signature information corresponding to the original five-tuple and a pointer pointing to a result table in a hash bucket in the hash table; and (2) obtaining a location-swapped target five-tuple by performing location swapping for the target five-tuple, and storing signature information corresponding to the location-swapped target five-tuple and a pointer pointing to the result table in a hash bucket in the hash table, where the location swap refers to that a source IP address is swapped with a destination IP address and a source port is swapped with a destination port.

The harsh table contains a record of signature information corresponding to an original five-tuple of a packet, which belongs to a forward hash record of the packet in the hash table; and a record of signature information corresponding to a location-swapped target five-tuple, which belongs to a reverse hash record of the packet in the hash table. In addition, the forward hash record and the reverse hash record corresponding to a same packet include the same pointer, that is, the forward hash record and the reverse hash record both corresponding to the same packet correspond to a same record in the result table. Any record in the result table at least includes: an original five-tuple of a packet, and a location-swapped target five-tuple corresponding to the packet.

In the present disclosure, the manner of storing five-tuple-related information in a hash table is changed. For example, for a plurality of five-tuples with a same IP address and consecutive ports, the hash buckets in the hash table respectively corresponding to the five-tuples are consecutive. Thus, a plurality of consecutive hash buckets may be read at one time, and whether the five-tuples corresponding to the consecutive hash buckets generate a hash conflict respectively may be determined.

To facilitate understanding the solutions, in an example of the present disclosure, a networking system applicable to a method provided by the present disclosure is provided, the structure of which is schematically illustrated in FIG. 1. As shown in FIG. 1, the networking system includes a host A, a NAT device B and a server C. The host A and the server C belong to different networks, that is, the host A belongs to an intranet and the server C belongs to an extranet. Therefore, when the host A sends a packet to the server C, the NAT device B is required to perform NAT processing for the packet from the host A, and then sends the NAT-processed packet to the server C. Similarly, when the server C sends a packet to the host A, the NAT device B is required to perform NAT processing for the packet from the server C, and then sends the NAT-processed packet to the host A. To improve creation performance, the NAT device B in FIG. 1 may perform NAT processing for the packet sent from the host A to the server C and the packet sent from the server C to the host A by using a NAT method provided by the present disclosure.

Figure 2:
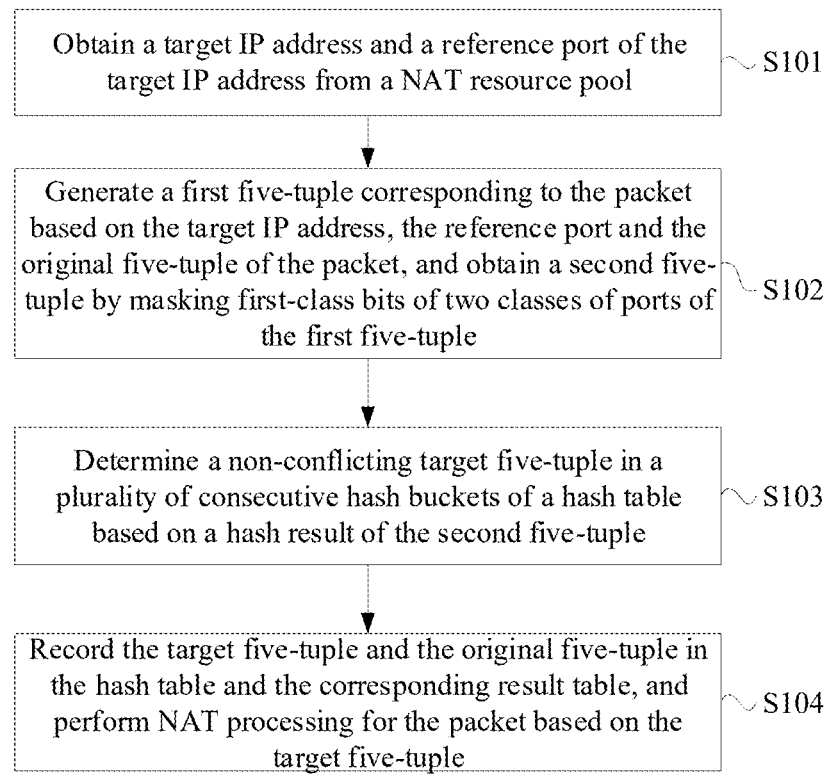
FIG. 2 is a flowchart illustrating a NAT method according to an example of the present disclosure.

As shown in FIG. 2, a NAT method provided by the present disclosure may include the following blocks.

At block S101, a target IP address and a reference port of the target IP address are obtained from a NAT resource pool, where the reference port is a port in a consecutive port range of the target IP address.

When a NAT device receives a packet from another device in the networking system, if the packet requires NAT processing and satisfies a session information creation condition, the NAT device performs a creation process. In the solution provided by the present disclosure, when performing the creation process, the NAT device may obtain a target IP address and a reference port of the target IP address from a NAT resource pool, where the reference port is a port in a consecutive port range of the target IP address. Further, the NAT device may perform port selection such as random selection or sequential selection with a value obtained by hash calculation for the original five-tuple of the packet.

For a packet, an original five-tuple of the packet may include a source IP address, a destination IP address, a source port, a destination port and a transport protocol. The translation requirement for NAT processing may include only translation for the source IP address or the destination IP address, and may also include translation for both the source IP address and the destination IP address. Therefore, after the target IP address and the reference port are obtained, if it is desired to translate the source IP address, the source IP address in the original five-tuple is replaced with the target IP address and the source port is replaced with the reference port; if it is desired to translate the destination IP address, the destination IP address in the original five-tuple is replaced with the target IP address and the destination port is replaced with the reference port. In the disclosure, the target IP address mentioned is an IP address taken from the NAT recourse pool as a source IP address or a destination IP address; the reference port is a port taken from a consecutive port range of the target IP address as a source port or a destination port.

Further, it may be determined based on an Access Control List (ACL) whether a packet requires NAT processing, a translation requirement for the NAT processing, a NAT resource pool for the NAT processing, and the like. There is a plurality of NAT resource pools stored in a NAT device, for handling different types of IP addresses, and each NAT recourse pool including IP addresses and port ranges corresponding to the IP addresses.

For example, for a packet in a data flow under a Transmission Control Protocol (TCP), whether the packet satisfies a session information creation condition may be specifically determined as follows:

it is determined whether the packet is a first packet; and if yes, it is determined that the packet satisfies the session information creation condition.

For a packet in a data flow under a User Datagram Protocol (UDP), whether the packet satisfies a session information creation condition may be specifically determined as follows:

it is determined whether the packet can be NAT-processed based on a session table directly, and if not, it is determined that the packet satisfies the session information creation condition.

Descriptions are made herein only with the TCP and the UDP as examples, which is not limited. In a specific application, similar processing may be performed for a packet in a data flow under any other protocol. For example, if the packet cannot be NAT-processed based on the session table directly, it is determined that the packet satisfies the session information creation condition.

A hash table is used in the process of determining whether NAT processing can be directly performed for a packet based on a session table, and the manner of storing the hash table is changed in the present disclosure. Therefore, the process of determining whether NAT processing can be directly performed for a packet based on a session table is also changed, which will be described below in detail.

At block S102, a first five-tuple corresponding to the packet is generated based on the target IP address, the reference port and the original five-tuple of the packet, and a second five-tuple is obtained by masking a first-class bit of a port of the first five-tuple, wherein, the port of the first five-tuple includes two types, i.e., a port subjected to NAT processing and a port not subjected to NAT processing.

At block S103, a non-conflicting target five-tuple is determined in a plurality of consecutive hash buckets of a hash table based on a hash result of the second five-tuple.

After the target IP address and the reference port are obtained, the NAT device may generate the first five-tuple corresponding to the packet by replacing the source IP address or the destination IP address in the original five-tuple of the packet with the target IP address and replacing the source port or the destination port in the original five-tuple with the reference port according to a translation requirement for the packet. After the first five-tuple is generated, the NAT device may obtain the second five-tuple by masking the first-class bits of two types of ports in the first five-tuple, that is, setting the first-class bits to 0. Further, the NAT device may determine a non-conflicting target five-tuple in a plurality of consecutive hash buckets of the hash table based on the hash result of the second five-tuple. Because it can not be determined that whether the source IP address or the destination IP address is to be translated when NAT processing is directly performed based on the session table, both the source port and the destination port in the first five-tuple are masked in the present disclosure.

A port may be indicated by 16 bits, that is, both the source port and the destination port are indicated by 16 bits. For the first-class bits, a number and a location of the bits may be set according to an actual situation. For example, the first-class bits may include the 0th bit of the port, or the 0th bit and the 1st bit of the port, or the 0th bit, the 1st bit and the 2nd bit of the port, or the 14th bit and the 15th bit of the port, or the like. For convenience of calculation, in a specific application, the first-class bits are at least one consecutive bit at the end of the port, and the specific number of bits may be set according to a specific application environment. For example, the first-class bits may be two consecutive bits at the end of the port, that is, the 0th bit and the 1st bit, or the first-class bits may be three consecutive bits at the end of the port, that is, the 0th bit, the 1st bit and the 2nd bit, or the first-class bits may be four consecutive bits at the end of the port, that is, the 0th bit, the 1st bit, the 2nd bit and the 3rd bit, or the like.

A storage region corresponding to the hash table is divided into a plurality of hash buckets, and a binary character string of a fixed number of bits is used as an index value of the hash bucket. In the present disclosure, to increase a conflict detection speed and improve creation performance, it is required to make the hash buckets corresponding to a plurality of five-tuples consecutive. Based on such requirement, a specific process of storing signature information corresponding to any five-tuple in a hash bucket in the hash table may include as follows.

(1) The first-class bits of the source port and the destination port in the five-tuple are masked, and an index value corresponding to the masked five-tuple is calculated by a first hash algorithm.

A plurality of five-tuples which differ only in the first-class bits of two types of ports may correspond to a same index value.

(2) The index value is performed with an offset processing to form a new index value with a fixed number of bits, and the signature information corresponding to the five-tuple is recorded in the hash bucket corresponding to the new index value. The offset processing includes: replacing low N bits of the index value with a combination of the first-class bits of two types of ports in the five-tuple, or supplementing the combination at the end of the index value, where N refers to a total number of the first-class bits of two types of ports in the five-tuple.

Based on the above manner in which any five-tuple is stored in the hash table, in order to detect whether a plurality of five-tuples are a non-conflicting five-tuple at one time, after the first five-tuple is obtained, the second five-tuple may be obtained by firstly masking the first-class bits of two types of ports of the first five-tuple, then a plurality of consecutive hash buckets are determined in the hash table based on the hash result of the second five-tuple, and further, a non-conflicting target five-tuple is determined in the plurality of consecutive hash buckets.

Specifically, the block of determining the non-conflicting target five-tuple in the plurality of consecutive hash buckets of the hash table based on the hash result of the second five-tuple may include:

calculating a first index value corresponding to the second five-tuple by the first hash algorithm;

obtaining a second index value by performing base address processing for the first index value, and determining M consecutive first-class hash buckets by querying the hash table with the second index value as a base address; and determining a non-conflicting target five-tuple in the M first-class hash buckets based on the second five-tuple and a second hash algorithm.

The base address processing includes: setting low N bits of the first index value to 0, or supplementing N bits of zeros at the end of the first index value.

N is a total number of the first-class bits of two types of ports, and M is $2^N$.

It may be understood that the above base address processing and offset processing have a correspondence. Specifically, the offset processing is to replace low N bits of an index value with a combination of the first-class bits of two types of ports in the five-tuple, and correspondingly, the base address processing is to set the low N bits of the first index value to 0; the offset processing is to supplement the combination at the end of the index value, and correspondingly, the base address processing is to supplement N bits of zeros at the end of the first index value. In addition, the first hash algorithm may include: a Message Digest Algorithm (MD) or a Secure Hash Algorithm (SHA), or the like.

Further, a specific process of determining the M consecutive first-class hash buckets by querying the hash table with the second index value as the base address may include: determining the first-class hash bucket corresponding to the second index value, and reading M consecutive first-class hash buckets by taking the first-class hash bucket corresponding to the second index value as a starting point. Further, the block of determining the non-conflicting target five-tuple in the M first-class hash buckets based on the second five-tuple and the second hash algorithm may include:

obtaining a third five-tuple by recovering the first-class bits of the first-class port in the second five-tuple, where the first-class port is a port not subjected to NAT processing in the original five-tuple;

performing conflict detection for the third five-tuple until a non-conflicting target five-tuple is determined in the M first-class hash buckets;

the conflict detection includes:

generating a fourth five-tuple by setting the first-class bits of the second-class port in the third five-tuple to 0 and/or 1, where the second-class port contained in the fourth five-tuple belongs to the consecutive port range and the second-class port is a port subjected to NAT processing in the original five-tuple;

calculating first signature information corresponding to the fourth five-tuple by the second hash algorithm;

determining a target hash bucket from the M first-class hash buckets by taking a first target value as a third index value, where the first target value is a combination of the first-class bits of two types of ports in the fourth five-tuple; and determining the fourth five-tuple as a non-conflicting target five-tuple when it is determined that the first signature information exists in valid signature information recorded in the target hash bucket.

The second hash algorithm may include: a Message Digest Algorithm (MD) or a Secure Hash Algorithm (SHA), or the like. Further, a specific process of determining the target hash bucket from the M first-class hash buckets by taking the first target value as the third index value includes: taking the first target value as the third index value, and then, taking the first-class hash bucket corresponding to the third index value in the M first-class hash buckets as the target hash bucket.

It may be understood that some ports are invalid ports in a NAT resource pool, and a port obtained by setting the first-class bits of the second-class port in the third five-tuple to 0 and/or 1 may be an invalid port in the NAT resource pool. Therefore, to prevent the second-class port of the fourth five-tuple from being an invalid port, when generating the fourth five-tuple, the second-class port of the fourth five-tuple may be defined within a consecutive port range to which the reference port belongs.

Further, it is to be noted that when a hash table is initialized, the signature information and the pointer in a hash entry may be set to invalid values. When a five-tuple is written into the hash table, the corresponding signature information and pointer may be changed to valid values according to the five-tuple. According to the solution of the present disclosure, to determine whether the signature information and the pointer are invalid values or valid values, one bit may be correspondingly set for each signature information and pointer in the hash entry. And whether the signature information and the pointer are invalid values or valid values can be determined by setting the bit to 0 or 1.

At block S104, the target five-tuple and the original five-tuple are recorded in the hash table and the corresponding result table, and NAT processing is performed for the packet based on the target five-tuple.

After the non-conflicting target five-tuple is determined from a plurality of consecutive hash buckets of the hash table, the target five-tuple and the original five-tuple may be recorded in the hash table and the corresponding result table, and NAT processing may be performed for the packet based on the target five-tuple. Recording the target five-tuple and the original five-tuple in the result table may include: recording, in the result table, the original five-tuple and a five-tuple obtained by performing location swapping for the target five-tuple. Performing NAT processing for the packet based on the target five-tuple may include: replacing the original five-tuple in the packet with the target five-tuple. In the present disclosure, a specific process of recording the target five-tuple and the original five-tuple in the hash table and the corresponding result table may include as follows.

(1) Signature information corresponding to the original five-tuple is calculated by the second hash algorithm; a new five-tuple is obtained by masking the first-class bits of the source port and the destination port of the original five-tuple; an index value of the new five-tuple corresponding to the original five-tuple is calculated by the first hash algorithm, and a new index value is obtained by performing offset processing for the index value of the new five-tuple based on a combination of the first-class bits of two types of ports of the original five-tuple; and a hash bucket is determined by querying the hash table with the new index value, and the signature information corresponding to the original five-tuple and the pointer pointing to the result table are stored in the determined hash bucket.

(2) A location-swapped target five-tuple is obtained by performing location swapping for the target five-tuple; the signature information corresponding to the location-swapped target five-tuple is calculated based on the second hash algorithm; a new five-tuple corresponding to the location-swapped target five-tuple is obtained by masking the first-class bits of two types of ports of the location-swapped target five-tuple; an index value of the new five-tuple is calculated based on the first hash algorithm; a new index value is formed by performing offset processing for the index value according to a combination of the first-class bits of two types of ports of the location-swapped target five-tuple; and a hash bucket is determined by querying the hash table with the new index value, and the signature information corresponding to the location-swapped target five-tuple and the pointer pointing to the result table are stored in the determined hash bucket. In addition, it is understood that when it is determined that the packet requires NAT processing, whether the packet can be directly NAT-processed based on a session table may also be determined before performing the creation process. Therefore, the NAT method provided by the present disclosure may also include the following blocks.

At block 01, when it is determined that the packet requires NAT processing, second signature information corresponding to the original five-tuple is calculated based on the second hash algorithm.

At block 02, a fifth five-tuple is obtained by masking the first-class bits of two types of ports of the original five-tuple.

At block 03, a fourth index value corresponding to the fifth five-tuple is calculated based on the first hash algorithm.

At block 04, a fifth index value is formed by performing offset processing for the fourth index value, and a second-class hash bucket is determined by querying the hash table with the fifth index value. The offset processing includes:

replacing low N bits of the fourth index value with a second target value or supplementing the second target value at the end of the fourth index value, where the second target value is a combination of the first-class bits of two types of ports of the original five-tuple.

At block 05, when it is determined that the second signature information exists in the valid signature information recorded in the second-class hash bucket, NAT processing is performed for the packet based on the result table; otherwise, the block of obtaining a target IP address and a reference port of the target IP address from a NAT resource pool is performed.

Specifically, NAT processing is performed for the packet based on the result table, as follows: determining a five-tuple from the result table according to the pointer corresponding to the second signature information recorded in the second-class hash bucket, and then, performing NAT processing for the packet based on the determined five-tuple.

In a solution provided by the present disclosure, a plurality of consecutive hash buckets of a hash table are determined at one time, and a non-conflicting target five-tuple is determined from the plurality of consecutive hash buckets of the hash table. That is, it is detected for a plurality of five-tuples corresponding to the plurality of consecutive hash buckets at one time whether the five-tuples are non-conflicting five-tuples. Thus, the number of times of reading the storage medium may be reduced during the conflict detection, thereby improving the creation performance in the NAT process.

A NAT method provided by the present disclosure is described below in combination with an application example.

In the application example, as shown in FIG. 1, the networking system specifically includes: a host A, a NAT device B and a server C, where an IP address of the host A is 192.168.1.2, an intranet IP address of the NAT device B is 192.168.1.1, an extranet IP address of the NAT device B is 1.1.1.1, and an IP address of the server C is 1.1.1.2.

Figure 3:
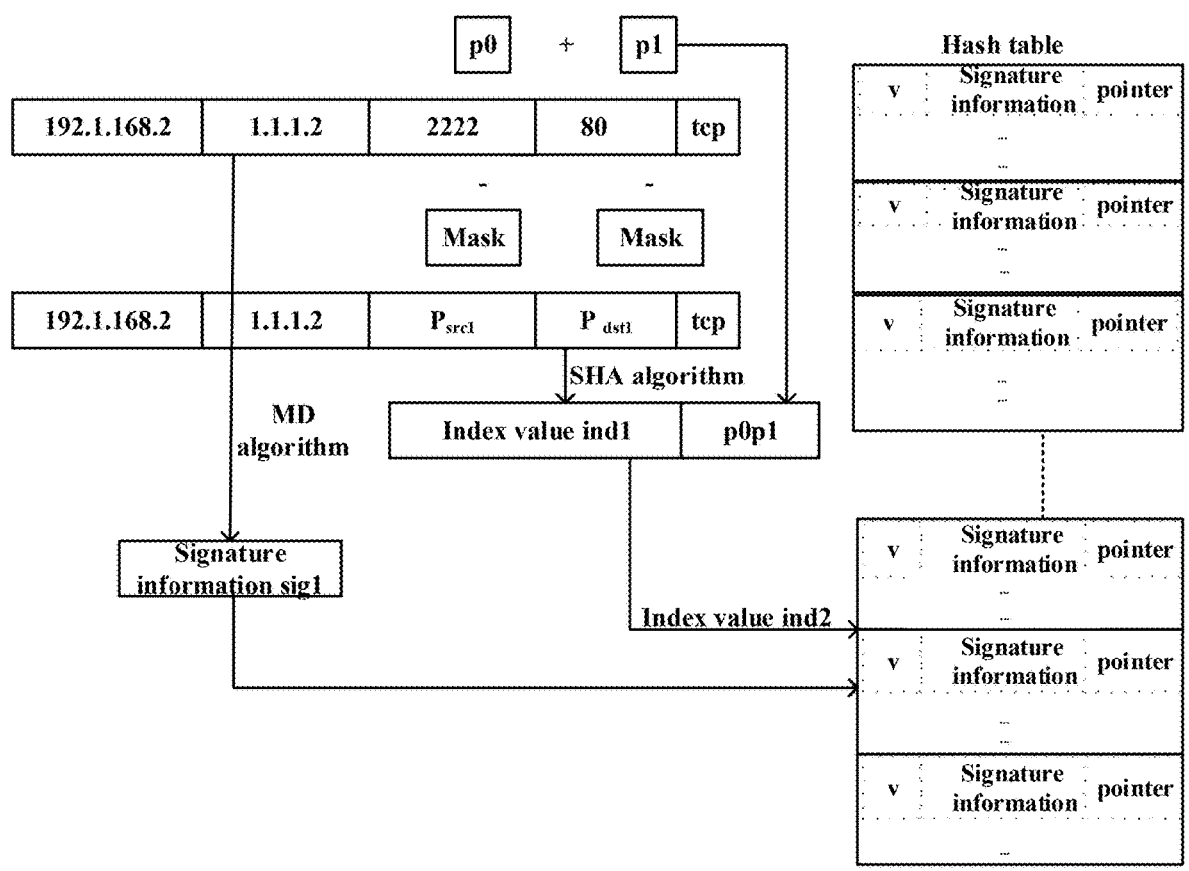
FIG. 3 is a schematic diagram illustrating performing source IP address translation based on a NAT method according to an example of the present disclosure.
Figure 4:
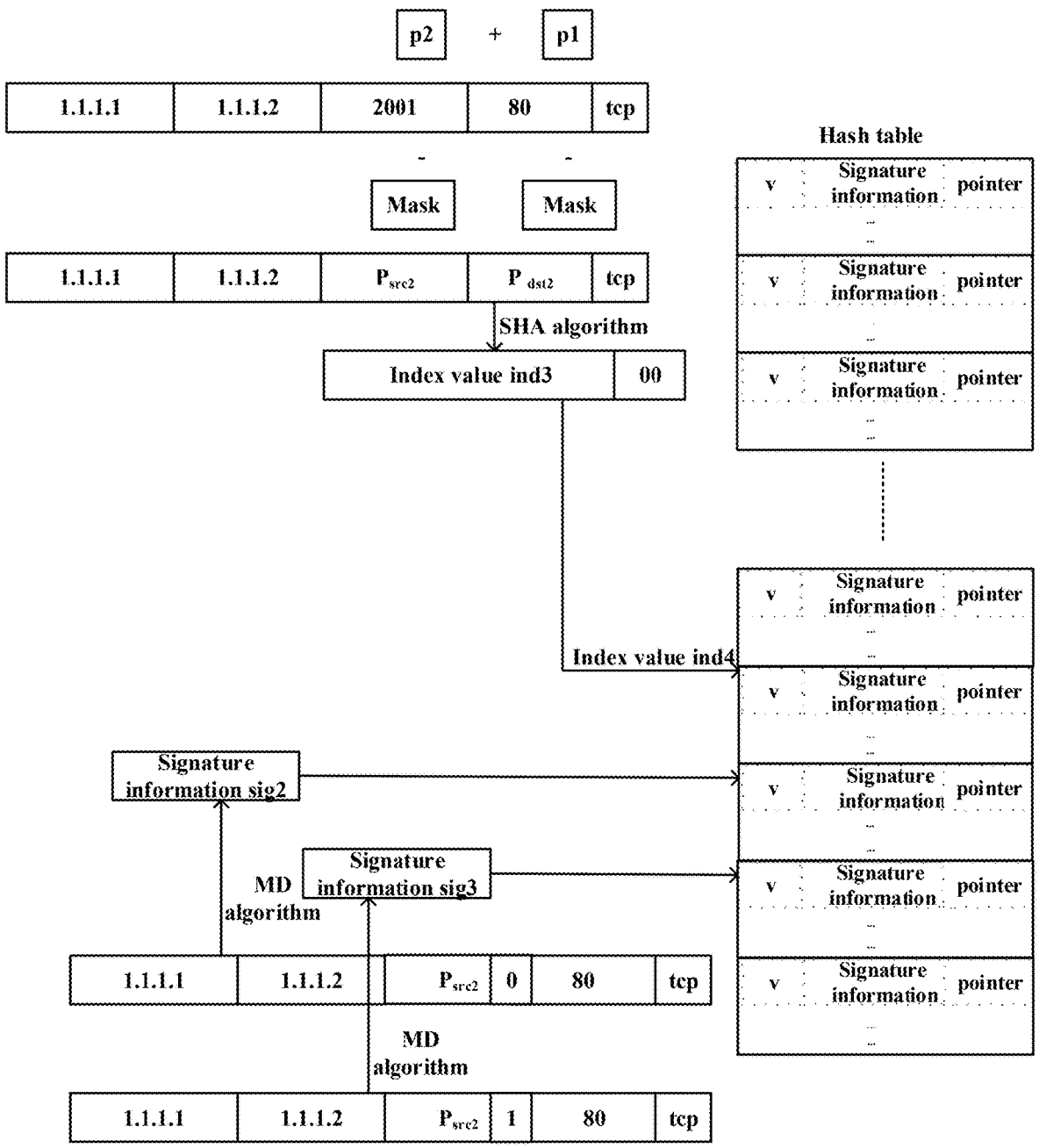
FIG. 4 is a schematic diagram illustrating performing source IP address translation based on a NAT method according to an example of the present disclosure.

As shown in FIG. 3 and FIG. 4, the NAT method provided by the present disclosure may include the following blocks.

At block s01, after receiving a packet sent from the host A to the server C, the NAT device B determines that the packet requires NAT processing based on an ACL.

At block s02, an original five-tuple (192.168.1.2, 1.1.1.2, 2222, 80, tcp) in the packet is extracted.

In the original five-tuple, a source IP address is 192.168.1.2, a destination IP address is 1.1.1.2, a source port is 2222, a destination port is 80, and a transport protocol is tcp.

At block s03, signature information sig1 corresponding to the original five-tuple is calculated based on the MD algorithm.

At block s04, a five-tuple G1 (192.168.1.2, 1.1.1.2, $P_{src1}$, $P_{dst1}$, tcp) is obtained by masking the 0th bit p0 of the source port and the 0th bit p1 of the destination port of the original five-tuple.

$P_{src1}$ refers to a value obtained by masking the 0th bit p0 of the source port 2222, and $P_{dst1}$ refers to a value obtained by masking the 0th bit p1 of the destination port 80.

At block s05, an index value ind1 corresponding to the five-tuple G1 is calculated based on the SHA algorithm.

At block s06, an index value ind2 is formed by replacing the last two bits of the index value ind1 with a combination of p0 and p1.

At block s07, a hash bucket D1 is determined by querying a hash table with the index value ind2.

At block s08, when it is determined that the signature information sig1 exists in the valid signature information recorded in the hash bucket D1, NAT processing is performed for the packet based on a result table; otherwise, block s09 is performed.

In the hash table shown in FIG. 3, v is used to identify whether the signature information and the pointer are valid values or invalid values. When v is 0, it indicates that the signature information and the pointer are invalid values; when v is 1, it indicates that the signature information and the pointer are valid values.

At block s09, an address translation type corresponding to the packet is determined as translating a source IP address based on the ACL.

At block s10, a target IP address and a reference port are obtained from a NAT resource pool corresponding to the source IP address.

It is assumed that the target IP address is 1.1.1.1, and the reference port is 2001.

At block s11, a five-tuple G2 is obtained by replacing the source IP address in the original five-tuple with the target IP address and replacing the source port in the original five-tuple with the reference port, and a five-tuple G3 is obtained by masking the 0th bit p2 of the source port and the 0th bit p1 of the destination port of the five-tuple G2.

As shown in FIG. 4, the five-tuple G2 is (1.1.1.1, 1.1.1.2, 2001, 80, tcp); correspondingly, the five-tuple G3 is (1.1.1.1, 1.1.1.2, $P_{src2}$, $P_{dst2}$, tcp).

$P_{src2}$ refers to a value obtained by masking the 0th bit p2 of the source port of the five-tuple G2, and $P_{dst2}$ refers to a value obtained by masking the 0th bit p1 of the destination port of the five-tuple G2.

At block s12, an index value ind3 corresponding to the five-tuple G3 is calculated based on the SHA algorithm.

At block s13, an index value ind4 is obtained by setting low two bits of the index value ind3 to 0, and 4 consecutive first-class hash buckets are read from the hash table by taking the index value ind4 as an index.

At block s14, a five-tuple G4 is obtained by recovering the masked bits of the destination port of the five-tuple G3.

The five-tuple G4 is (1.1.1.1, 1.1.1.2, $P_{src2}$, 80, tcp).

At block s15, a five-tuple G5 is obtained by setting the 0th bit P2 of the source port of the five-tuple G4 to 0, signature information sig2 corresponding to the five-tuple G5 is calculated based on the MD algorithm, a hash bucket D2 is determined from the 4 consecutive first-class hash buckets by taking a combination of p2 and p1 as an index, and whether the signature information sig2 exists in the valid signature information recorded in the hash bucket D2 is determined; if not, the five-tuple G5 is taken as the target five-tuple corresponding to the packet, the five-tuple G5 and the original five-tuple are recorded in the hash table and the corresponding result table, and NAT processing is performed for the packet based on the five-tuple G5; if yes, block s16 is performed.

At block s16, a five-tuple G6 is obtained by setting the 0th bit p2 of the source port of the five-tuple G4 to 1, signature information sig3 corresponding to the five-tuple G6 is calculated based on the MD algorithm, a hash bucket D3 is determined from the 4 consecutive first-class hash buckets by taking the combination of p2 and p1 as an index, and whether the signature information sig3 exists in the valid signature information recorded in the hash bucket D3 is determined; if not, the five-tuple G6 is taken as the target five-tuple corresponding to the packet, the five-tuple G6 and the original five-tuple are recorded in the hash table and the corresponding result table, and NAT processing is performed for the packet based on the five-tuple G6; if yes, the process is returned to block s10, that is, a new target IP address and a new reference port are obtained from a NAT resource pool corresponding to the source IP address.

When the address translation type corresponding to the original five-tuple is translating a destination IP address, NAT process is similar to blocks s01-s16 except that the processing of the destination port and the source port is swapped.

It may be seen that in this example, the problem of poor creation performance of session information may be solved since the number of times of reading the storage medium is reduced during the conflict detection.

Figure 5:
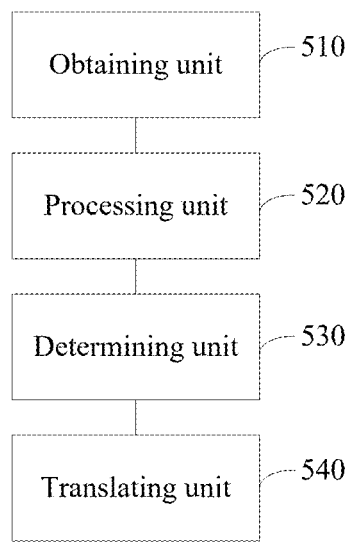
FIG. 5 is a schematic diagram illustrating a structure of a NAT apparatus according to an example of the present disclosure.

Corresponding to the above method example, the present disclosure provides a NAT apparatus. As shown in FIG. 5, the apparatus includes:

an obtaining unit 510, configured to obtain a target IP address and a reference port of the target IP address from a NAT resource pool, where the reference port is a port in a consecutive port range of the target IP address;

a processing unit 520, configured to generate a first five-tuple corresponding to a packet based on the target IP address, the reference port and an original five-tuple of the packet and obtain a second five-tuple by masking first-class bits of two classes of ports in the first five-tuple respectively;

a determining unit 530, configured to determine a target five-tuple in a plurality of consecutive hash buckets of a hash table based on a hash result of the second five-tuple;

a translating unit 540, configured to record the target five-tuple and the original five-tuple in the hash table and a result table corresponding to the hash table and perform NAT processing for the packet based on the target five-tuple.

In a solution provided by the present disclosure, a plurality of consecutive hash buckets may be determined at one time, and a non-conflicting target five-tuple is determined from a plurality of consecutive hash buckets of the hash table. That is, it may be detected for a plurality of consecutive hash buckets at one time whether a plurality of five-tuples corresponding to the plurality of consecutive hash buckets are non-conflicting five-tuples. Thus, the number of times of reading the storage medium may be reduced during the conflict detection, thereby improving the creation performance in the NAT process.

Optionally, the determining unit 530 may include:

a calculating sub-unit, configured to calculate a first index value corresponding to the second five-tuple based on a first hash algorithm;

a querying sub-unit, configured to obtain a second index value by performing base address processing for the first index value and determine M consecutive first-class hash buckets by querying the hash table with the second index value as a base address; and a determining sub-unit, configured to determine a target five-tuple from the M first-class hash buckets based on the second five-tuple and a second hash algorithm.

The base address processing includes: setting low N bits of the first index value to 0, or supplementing N bits of zeros at the end of the first index value.

N is a total number of the first-class bits of the two classes of ports, and M is $2^N$.

Optionally, the determining sub-unit is specifically configured to:

obtain a third five-tuple by recovering the first-class bits of the first-class port in the second five-tuple, where the first-class port is a port not subjected to NAT processing in the original five-tuple; and perform a conflict detection for the third five-tuple until a target five-tuple is determined from the M first-class hash buckets.

The conflict detection includes:

generating a fourth five-tuple by setting the first-class bits of the second-class port in the third five-tuple to 0 and/or 1, wherein a second-class port in the fourth five-tuple belongs to the consecutive port range, the second-class port is a port subjected to NAT processing in the original five-tuple;

calculating first signature information corresponding to the fourth five-tuple based on the second hash algorithm;

determining a target hash bucket from the M first-class hash buckets by taking a first target value as a third index value, where the first target value is a combination of the first-class bits of two classes of ports in the fourth five-tuple; and determining the fourth five-tuple as a target five-tuple when the first signature information exists in valid signature information recorded in the determined target hash bucket.

Optionally, the apparatus also includes:

a calculating unit, configured to calculate second signature information corresponding to the original five-tuple based on the second hash algorithm when determining that the packet requires NAT processing;

a masking unit, configured to obtain a fifth five-tuple by masking the first-class bits of two classes of ports in the original five-tuple;

a generating unit, configured to calculate a fourth index value corresponding to the fifth five-tuple based on the first hash algorithm;

an indexing unit, configured to form a fifth index value by performing offset processing for the fourth index value and determine a second-class hash bucket by querying the hash table with the fifth index value, where the offset processing includes: replacing low N bits of the fourth index value with a second target value or supplementing the second target value at the end of the fourth index value, where the second target value is a combination of the first-class bits of two classes of ports in the original five-tuple; and an analyzing unit, configured to perform NAT processing for the packet based on the result table when the second signature information exists in the valid signature information recorded in the second-class hash bucket; otherwise, obtain a new target 1P address and a reference port of the new target IP address from a NAT resource pool.

Since the apparatus examples substantially correspond to the method examples, a reference may be made to part of the descriptions of the method examples for the related part. The apparatus examples described above are merely illustrative, where the units described as separate members may be or not be physically separated, and the members displayed as units may be or not be physical units, i.e., may be located in one place, or may be distributed to a plurality of network units. Part or all of the modules may be selected according to actual requirements to implement the objectives of the solutions in the examples. Those of ordinary skill in the art may understand and carry out them without creative work.

Figure 6:
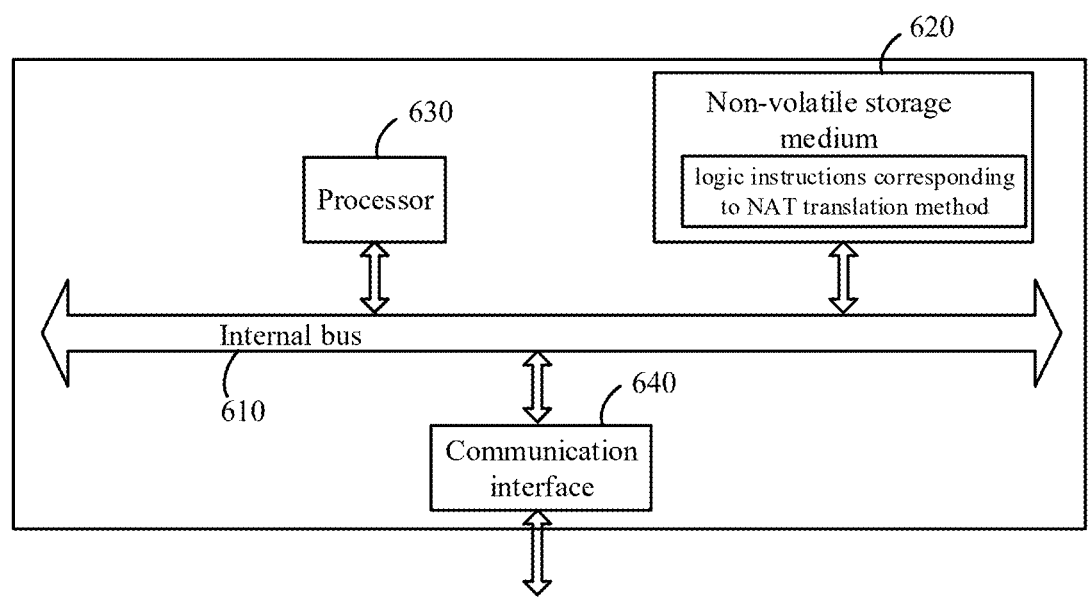
FIG. 6 is a schematic diagram illustrating a structure of a NAT device according to an example of the present disclosure.

Further, corresponding to the above method example, the present disclosure also provides a NAT device. As shown in FIG. 6, the NAT device includes: an internal bus 610, a non-volatile storage medium 620, a processor 630 and a communication interface 640, where the processor 630, the communication interface 640, and the non-volatile storage medium 620 communicate with each other via the internal bus 610.

The non-volatile storage medium 620 is configured to store machine executable instructions corresponding to a NAT method.

The processor 630 is configured to read the machine executable instructions on the non-volatile storage medium 620 to perform the NAT method provided by the present disclosure.

Relevant descriptions of specific blocks of the NAT method may be referred to descriptions of the method examples of the present disclosure, which are not described herein. Further, it is to be emphasized that the NAT device may be a router, which is not limited herein.

The non-volatile storage medium 620, for example, may be a non-volatile memory. The processor 630 may invoke and execute logic instructions for implementing the NAT method on the non-volatile storage medium 620 to perform the above NAT method.

The functions for implementing NAT logic instructions, if implemented in the form of software functional units and sold or used as independent products, may be stored in a machine readable storage medium. Based on such understanding, the technical scheme of the present disclosure essentially or a part contributing to the prior art or part of the technical scheme may be embodied in the form of a software product, the computer software product is stored in a storage medium, and includes several instructions for enabling a computer device (such as a personal computer, a server or a network device) to execute all or part of the blocks of the method disclosed by the examples of the present disclosure; and the above storage mediums include various mediums such as a USB disk, a mobile hard disk, a read-only memory (ROM), a random access memory (RAM), a diskette or a compact disk and the like which may store program codes.

After considering the specification and practicing the present disclosure, the persons of skill in the art may easily conceive of other implementations of the present disclosure. The present disclosure is intended to include any variations, uses and adaptive changes of the present disclosure. These variations, uses and adaptive changes follow the general principle of the present disclosure and include common knowledge or conventional technical means in the prior art not disclosed in the present disclosure. The specification and examples herein are intended to be illustrative only and the real scope and spirit of the present disclosure are indicated by the claims of the present disclosure.

It is to be understood that the present disclosure is not limited to the precise structures described above and shown in the accompanying drawings and may be modified or changed without departing from the scope of the present disclosure. The scope of protection of the present disclosure is limited only by the appended claims.

The foregoing disclosure is merely illustrative of examples of the present disclosure but not intended to limit the present disclosure, and any modifications, equivalent substitutions, adaptations thereof made within the spirit and principles of the disclosure shall be encompassed in the scope of protection of the present disclosure.

The invention claimed is:

1. A Network Address Translation (NAT) method, comprising:
    obtaining a target Internet Protocol (IP) address and a reference port of the target IP address from a NAT resource pool, wherein the reference port is a port in a consecutive port range of the target IP address;
    generating a first five-tuple corresponding to a packet based on the target IP address, the reference port and an original five-tuple of the packet, and obtaining a second five-tuple by masking first-class bits of two classes of ports in the first five-tuple respectively;
    determining a target five-tuple in a plurality of consecutive hash buckets of a hash table based on a hash result of the second five-tuple; and
    recording the target five-tuple and the original five-tuple in the hash table and a result table corresponding to the hash table, and performing NAT processing for the packet based on the target five-tuple.

2. The method according to claim 1, wherein determining the target five-tuple in the plurality of consecutive hash buckets of the hash table based on the hash result of the second five-tuple comprises:
    calculating a first index value corresponding to the second five-tuple based on a first hash algorithm;
    obtaining a second index value by performing base address processing for the first index value, and determining M consecutive first-class hash buckets by querying the hash table with the second index value as a base address; and
    determining a target five-tuple from the M first-class hash buckets based on the second five-tuple and a second hash algorithm;
    the base address processing comprising either of the following:
        setting low N bits of the first index value to 0, and
        supplementing N bits of zeros at the end of the first index value;
        N is a total number of the first-class bits of the two classes of ports, and M is $2^N$.

3. The method according to claim 2, wherein determining the target five-tuple from the M first-class hash buckets based on the second five-tuple and the second hash algorithm comprises:
    obtaining a third five-tuple by recovering the first-class bits of a first-class port in the second five-tuple, wherein the first-class port is a port not subjected to NAT processing in the original five-tuple;
    performing conflict detection for the third five-tuple until the target five-tuple is determined in the M first-class hash buckets;
    wherein the conflict detection comprises:
        generating a fourth five-tuple by setting the first-class bits of a second-class port in the third five-tuple to 0 and/or 1, wherein a second-class port in the fourth five-tuple belongs to the consecutive port range, wherein, the second-class port is a port subjected to NAT processing in the original five-tuple;
        calculating first signature information corresponding to the fourth five-tuple based on the second hash algorithm;
        determining a target hash bucket from the M first-class hash buckets by taking a first target value as a third index value, wherein the first target value is a combination of the first-class bits of the two classes of ports in the fourth five-tuple; and
        determining the fourth five-tuple as the target five-tuple when the first signature information exists in valid signature information recorded in the determined target hash bucket.

4. The method according to claim 1, wherein, the method further comprising:
    calculating second signature information corresponding to the original five-tuple based on the second hash algorithm when determining that the packet requires NAT processing;

obtaining a fifth five-tuple by masking the first-class bits of the two classes of ports in the original five-tuple;

calculating a fourth index value corresponding to the fifth five-tuple based on the first hash algorithm;

forming a fifth index value by performing offset processing for the fourth index value, and determining a second-class hash bucket by querying the hash table with the fifth index value, wherein the offset processing comprises either of the following:

replacing low N bits of the fourth index value with a second target value and supplementing the second target value at the end of the fourth index value, the second target value is a combination of the first-class bits of the two classes of ports in the original five-tuple; and performing NAT processing for the packet based on the result table when the second signature information exists in valid signature information recorded in the second-class hash bucket, and obtaining a new target IP address and a reference port of the new target IP address from the NAT resource pool when no second signature information exists in valid signature information recorded in the second-class hash bucket.

5. The method according to claim 1, wherein the first-class bits are at least one consecutive bit at the end of a bit sequence for indicating a port.

6. A Network Address Translation (NAT) device, comprising: an internal bus, a non-transitory storage medium, a processor and a communication interface, wherein the processor, the communication interface, and the non-transitory storage medium communicate with each other via the internal bus; wherein the storage medium is configured to store machine executable instructions corresponding to a NAT method;

the processor is configured to read the machine executable instructions on the storage medium to:

obtain a target Internet Protocol (IP) address and a reference port of the target IP address from a NAT resource pool, wherein the reference port is a port in a consecutive port range of the target IP address;

generate a first five-tuple corresponding to a packet based on the target IP address, the reference port and an original five-tuple of the packet, and obtain a second five-tuple by masking first-class bits of two classes of ports of the first five-tuple respectively;

determine a target five-tuple in a plurality of consecutive hash buckets of a hash table based on a hash result of the second five-tuple; and record the target five-tuple and the original five-tuple in the hash table and a result table corresponding to the hash table, and perform NAT processing for the packet based on the target five-tuple.

7. The NAT device according to claim 6, wherein when determining the target five-tuple in the plurality of consecutive hash buckets of the hash table based on the hash result of the second five-tuple, the processor is also caused by the machine executable instructions to:

calculate a first index value corresponding to the second five-tuple based on a first hash algorithm;

obtain a second index value by performing base address processing for the first index value and determining M consecutive first-class hash buckets by querying the hash table with the second index value as a base address; and determine a target five-tuple from the M first-class hash buckets based on the second five-tuple and a second hash algorithm;

the base address processing comprising either of the following:

setting N low bits of the first index value to 0, and supplementing N bits of zeros at the end of the first index value;

N is a total number of the first-class bits of the two classes of ports, and M is $2^N$.

8. The NAT device according to claim 7, wherein when determining the target five-tuple from the M first-class hash buckets based on the second five-tuple and the second hash algorithm, the processor is also caused by the machine executable instructions to:

obtain a third five-tuple by recovering the first-class bits of a first-class port in the second five-tuple, wherein the first-class port is a port not subjected to NAT processing in the original five-tuple;

perform conflict detection for the third five-tuple until the target five-tuple is determined in the M first-class hash buckets;

the conflict detection comprises:

generating a fourth five-tuple by setting the first-class bits of a second-class port in the third five-tuple to 0 and/or 1, wherein a second-class port in the fourth five-tuple belongs to the consecutive port range, wherein, the second-class port is a port subjected to NAT processing in the original five-tuple;

calculating first signature information corresponding to the fourth five-tuple based on the second hash algorithm;

determining a target hash bucket from the M first-class hash buckets by taking a first target value as a third index value, wherein the first target value is a combination of the first-class bits of the two classes of ports in the fourth five-tuple; and determining the fourth five-tuple as the target five-tuple when the first signature information exists in valid signature information recorded in the determined target hash bucket.

9. The NAT device according to claim 6, wherein the processor is also caused by the machine executable instructions to:

calculate second signature information corresponding to the original five-tuple based on the second hash algorithm when determining that the packet requires NAT processing;

obtain a fifth five-tuple by masking the first-class bits of the two classes of ports in the original five-tuple;

calculate a fourth index value corresponding to the fifth five-tuple based on the first hash algorithm;

form a fifth index value by performing offset processing for the fourth index value, and determine a second-class hash bucket by querying the hash table with the fifth index value, wherein the offset processing comprises either of the following:

replacing low N bits of the fourth index value with a second target value and supplementing the second target value at the end of the fourth index value, the second target value is a combination of the first-class bits of the two classes of ports in the original five-tuple; and perform NAT processing for the packet based on the result table when the second signature information exists in valid signature information recorded in the second-class hash bucket, and obtain a new target IP address and a reference port of the new target IP address from the NAT resource pool when no second signature information exists in valid signature information recorded in the second-class hash bucket.

10. The NAT device according to claim 6, wherein the first-class bits are at least one consecutive bit at the end of a bit sequence for indicating a port.

* * * * *